(12) United States Patent
Hiranaka

(10) Patent No.: US 12,410,095 B2
(45) Date of Patent: Sep. 9, 2025

(54) CRYSTALLIZATION METHOD OF GYPSUM

(71) Applicant: Tokuyama Corporation, Shunan (JP)

(72) Inventor: Shingo Hiranaka, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 17/790,149

(22) PCT Filed: Oct. 29, 2021

(86) PCT No.: PCT/JP2021/040096
§ 371 (c)(1),
(2) Date: Jun. 30, 2022

(87) PCT Pub. No.: WO2023/032232
PCT Pub. Date: Mar. 9, 2023

(65) Prior Publication Data
US 2024/0199482 A1    Jun. 20, 2024

(30) Foreign Application Priority Data
Sep. 2, 2021  (JP) ................. 2021-143115

(51) Int. Cl.
*C04B 11/26* (2006.01)
*B09B 3/45* (2022.01)
*C01F 11/46* (2006.01)

(52) U.S. Cl.
CPC ............ *C04B 11/262* (2013.01); *B09B 3/45* (2022.01); *C01F 11/466* (2013.01); *C01F 11/468* (2013.01)

(58) Field of Classification Search
CPC ..... C04B 11/262; C04B 11/26; C04B 11/266; C04B 11/268; C04B 11/28; C04B 11/30; C04B 11/00; C04B 11/02; C04B 11/05; C04B 11/06; C04B 11/002; C04B 11/005; C04B 11/007; C04B 18/064; B09B 3/20; B09B 3/45; C01F 11/468; C01F 11/466;
(Continued)

(56) References Cited

U.S. PATENT DOCUMENTS 2,913,308 A * 11/1959 Dailey ................. C04B 11/024
423/172
4,391,784 A * 7/1983 Hill, Sr. ............... C01B 25/225
516/122

(Continued)

FOREIGN PATENT DOCUMENTS

EP      0110128 B1 *  1/1987 ............. C04B 11/02
JP      50-43096 A      4/1975
(Continued)

OTHER PUBLICATIONS

English Translation of EP-0110128-B1 (Year: 1987).*

*Primary Examiner* — Paul A Wartalowicz
*Assistant Examiner* — Slone Elizabeth Simkins
(74) *Attorney, Agent, or Firm* — Keating & Bennett, LLP

(57) ABSTRACT

Wasted gypsum boards are crushed and calcined to gypsum granular solid, and the gypsum granular solid is mixed with water to form gypsum slurry. Gypsum particles are deposited from the gypsum slurry in a crystallization tank. Heated steam is blown into the gypsum slurry at a height from surface of the gypsum slurry and down to upper ⅕ of the gypsum slurry to heat the gypsum slurry and to eliminate foam on the gypsum slurry.

5 Claims, 2 Drawing Sheets

(58) Field of Classification Search
CPC .............. C01P 2004/61; C01P 2006/14; C01P 2006/82
See application file for complete search history.

(56) References Cited

U.S. PATENT DOCUMENTS

| | | |
|---|---|---|
| 10,023,496 B1 * | 7/2018 | Xu .................. C01F 11/466 |
| 10,947,155 B2 * | 3/2021 | Hiranaka ............. C04B 11/032 |
| 2011/0135930 A1 | 6/2011 | Yokoyama et al. |
| 2014/0030173 A1 | 1/2014 | Yokoyama et al. |
| 2020/0123055 A1 | 4/2020 | Hiranaka et al. |

FOREIGN PATENT DOCUMENTS

| | | |
|---|---|---|
| JP | 57-22888 B2 | 5/1982 |
| JP | 2014-88312 A | 5/2014 |
| JP | 2015-51920 A | 3/2015 |
| JP | 2020-065965 A | 4/2020 |
| JP | 2020-114790 A | 7/2020 |
| WO | 2012/176688 A1 | 12/2012 |

* cited by examiner

CRYSTALLIZATION METHOD OF GYPSUM

TECHNICAL FIELD

The present invention relates to a crystallization method of gypsum.

BACKGROUND ART

The present inventor and others have proposed to reclaim gypsum from wasted gypsum boards (e.g., Patent Document 1: WO2012/176688). The wasted gypsum boards are crushed by a crusher and calcined to hemihydrate and/or anhydrous Type III gypsum granular solid. The resultant gypsum is mixed with water, etc., and particles of dihydrate gypsum and so on are deposited in a crystallization tank, and then, gypsum is reclaimed by solid-liquid separation.

The type of gypsum deposited in the crystallization tank varies depending on the slurry temperature. For example, dihydrate gypsum is deposited at temperatures up to 90 degree Celsius, and hemihydrate gypsum and/or anhydrous type III gypsum are deposited at higher temperatures. In the range from room temperature to 90 degree Celsius, the higher the temperature, the deposited dihydrate gypsum becomes larger in grain size and has a higher industrial value. For this reason, the gypsum slurry in the crystallization tank is heated, but the heating is costly.

Wasted gypsum boards contain surfactants and so on. They cause foaming and make gypsum slurry overflow from the crystallization tank when mixing gypsum with the slurry. Further, the foam covering the gypsum granular solid delays the dissolution of the gypsum granular solid into the slurry.

PRIOR DOCUMENT LIST

Patent Document

Patent document 1: WO2012/176688

SUMMARY OF THE INVENTION

Problem to be Solved

The object of the present invention is to reduce the cost of heating gypsum slurry and to eliminate the foam in the crystallization tank when crystallizing the gypsum slurry derived from wasted gypsum boards.

Means for Solving the Problem

Wasted gypsum boards are crushed and calcined to gypsum granular solid, the gypsum granular solid is mixed with water to form gypsum slurry, and gypsum particles are deposited from the gypsum slurry in a crystallization tank.

According to the present invention, heated steam is blown into the gypsum slurry at a height from the surface of the gypsum slurry and down to the upper ⅕ of the gypsum slurry for heating the gypsum slurry, and for eliminating foam on the gypsum slurry.

Blowing the heated steam directly in the gypsum slurry has a higher thermal efficiency than flowing a heated thermal medium through a heater jacket enclosing the crystallization tank for indirect heating. More, the heated steam blown in the upper portion of the gypsum slurry heats, expands, and breaks the foam on the gypsum slurry. Therefore, the heating and defoaming of the gypsum slurry are carried out simultaneously.

For maintaining the gypsum slurry at a predetermined temperature, in addition to the heating by the steam, a heater jacket may be provided to cover the crystallization tank and to circulate a thermal medium within the heater jacket. However, it is preferable to maintain the gypsum slurry at the predetermined temperature without another thermal source provided in the crystallization tank for reducing the heating cost.

Preferably, the crystallization tank comprises plural crystallization tanks in series, and the gypsum slurry resultant by mixing the gypsum granular solid with water is supplied into the most upstream crystallization tank. The gypsum slurry is moved from an upstream tank to a downstream tank in series, and the heated steam is only blown into the most upstream crystallization tank. The heated steam blown into the most upstream crystallization tank maintains the slurry temperature in the downstream crystallization tank near the predetermined temperature. Since the foam is generated in the most upstream crystallization tank, the elimination of the foam in the most upstream tank is enough.

FEATURES FOR CARRYING OUT THE INVENTION

One Embodiment for carrying out the present invention will be described. The scope of the present invention shall be determined based on the claims and in accordance with the understanding of those skilled in the art, taking into consideration the description of the specification and well-known art in the field. The scope of the present invention is not limited by the embodiment.

Embodiment

Figure 1:
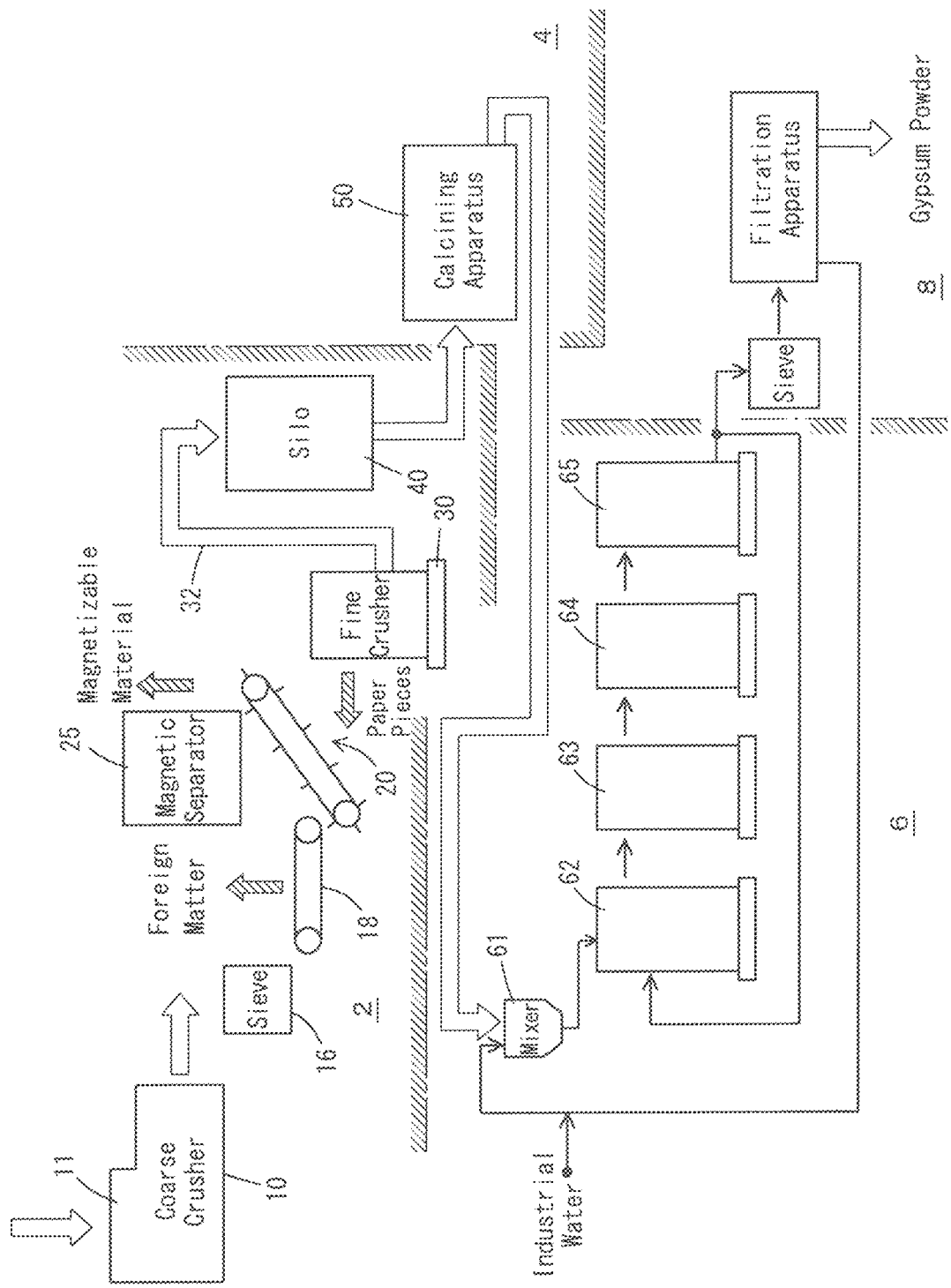
FIG. 1: A summary diagram indicating the reclaiming method of gypsum from wasted gypsum boards.
Figure 2:
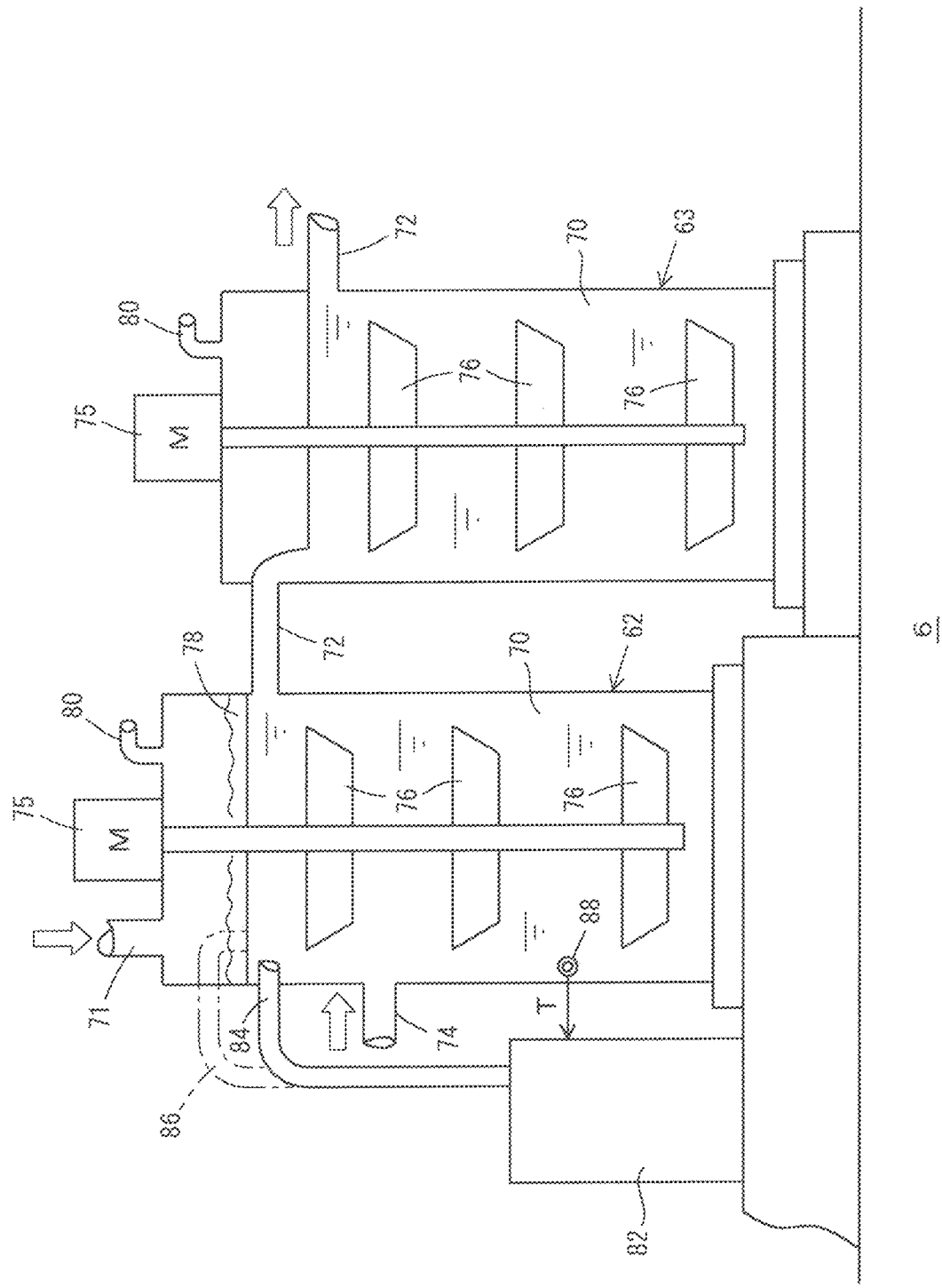
FIG. 2: A schematic vertical cross-sectional view of the crystallization tanks according to the embodiment.

FIGS. 1 and 2 show the embodiment. FIG. 1 shows the method from crushing wasted gypsum boards to reclaiming of new gypsum. In the first pretreatment process 2, wasted gypsum boards, not shown in the figure, are coarsely crushed by a coarse crusher 10 through an inlet port 11. The coarsely crushed pieces are separated by a sieve 16 to gypsum powder as the under-sieve component. The remaining over-sieve component is conveyed on a sorting conveyor 18, and foreign matters such as metal, wood chips, mortar, etc. are removed manually or automatically. After removing the foreign matters, the crushed pieces and so on are conveyed by a metering conveyor 20, and magnetizable matters such as metals are separated by a magnetic separator 25. Then, gypsum pieces are crushed into fine gypsum granular solid by a fine crusher 30, for example, and paper pieces are further removed by a built-in sieve in the fine crusher 30. Then, the gypsum granular solid is further conveyed by an air current through a magnetic separation pipe 32, and small metal objects, such as screws and nails, are separated by magnets installed in the magnetic separation pipe 32. The gypsum granular solid passed through the magnetic separation pipe 32 is stocked in a silo 40.

In the next calcining process 4, gypsum granular solid is calcined by a calcining apparatus 50 to convert them to hemihydrate and/or anhydrous type III gypsum. The calcined gypsum granular solid is crystallized in the third crystallization process 6. First, the calcined gypsum granular solid is mixed with an aqueous medium, such as gypsum slurry, in a mixer 61. Gypsum is then crystallized from the slurry in crystallization tanks 62-65, for example, in a series of 4 stages, and dihydrate gypsum particles are deposited. As a remark, when the temperature of crystallization tanks 62-65 is increased above 90 degree Celsius, hemihydrate gypsum or the like is deposited. The crystallization tank 62 is the most upstream tank, and the numbers 62-65 indicate the order from the upstream to the downstream tanks. The gypsum slurry is circulated among the crystallization tanks 62-65. In the embodiment, the gypsum slurry is returned from the crystallization tank 65 to the crystallization tank 62, but the circulation of the gypsum slurry may be omitted.

The gypsum granular solid may be fed into the aqueous medium flowing through a chute or a similar device without using the mixer 61. A single-stage large crystallization tank may be used instead of the multi-stage crystallization tanks 62-65.

In the filtration process 8, the gypsum slurry is extracted from the crystallization tank 65, etc., and sieved to remove paper fragments. The gypsum slurry is then solid-liquid separated in a filtration apparatus to extract gypsum particles such as dihydrate gypsum particles. The remaining liquid component is circulated, for example, to the mixer 61. Industrial water is added to replenish the water lost as the crystallization water and adhering water of the gypsum particles.

FIG. 2 shows the crystallization tanks 62 and 63, and the third and fourth crystallization tanks 64 and 65 are configured in the same manner as the second stage crystallization tank 63. Gypsum slurry 70 is stored in the crystallization tanks 62 and 63, and the gypsum slurry is supplied from a slurry supply pipe 71 connected to the mixer into the tank 62. A circulation pipe 72 connects the crystallization tanks 62, 63, and so on, and moves the gypsum slurry to the downstream tanks 63-65 by natural flow, for example. The gypsum slurry is circulated to the most upstream tank 62 by a circulation pipe 74 from the most downstream tank 65. Each of the crystallization tanks 62-65 is provided with vanes 76 and a driving motor 75 to stir the gypsum slurry 70. When the slurry is made from hemihydrate and/or anhydrous Type III gypsum derived from the wasted gypsum boards, foam 78 is generated, especially in the most upstream crystallization tank 62 due to surfactants and so on in the wasted gypsum boards.

At or just under the slurry level of the most upstream crystallization tank 62, generally, at a height down to the upper ⅓ from the surface of the slurry 70, an outlet of a steam introduction pipe 84 is placed to blow heated steam into the gypsum slurry 70. Steam may be blown into the gypsum slurry from just over the slurry level as in the steam introduction pipe 86 shown by the chain line. Indicated by 82 is a steam generator such as a boiler. A temperature sensor 88 measures the temperature T of the gypsum slurry 70 to control the steam generator 82.

The heated steam blown in from the steam inlet pipes 84 or 86 is, for example, at 130 degree Celsius and with 1 atmospheric pressure, and so on. Steam with 0.2 to 2 atmospheric pressure and at 100 to 150 degree Celsius is preferable for easy operation. The pressure here indicates the difference from the outside atmospheric pressure, and 0.2 to 2 atmospheric pressures indicate 1.2 to 3 atmospheric pressures of pressurized steam in the absolute pressure. The heated steam is, in most cases, superheated steam having a temperature over 100 degree Celsius. When the gypsum slurry in the most upstream tank 62 is made at just under 90 degree Celsius, all the crystallization tanks 62-65 are maintained at the required temperature, except in cold climates. It is less expensive to blow the heated steam directly into the crystallization tank 62 than to heat indirectly the crystallization tank 62 by a heater jacket or other means.

The heated steam blown in the slurry heats the slurry near the slurry surface, expands, and breaks the foam 78 as a result. Therefore, the foam 78 is eliminated at the same time as the gypsum slurry 70 is heated. The blowing of the heated steam dilutes the gypsum slurry, but it is usually less than the water exhausted as the crystallization water and the adhering water of the deposited dihydrate gypsum. Therefore, except in cold climates, a heating jacket or a similar device is not needed other than the heated steam.

LIST OF SYMBOLS 2 pretreatment process
4 calcining process
6 crystallization process
8 filtration process
10 coarse crusher
11 inlet port
16 sieve
18 sorting conveyor
20 metering conveyor
25 magnetic separator
30 fine crusher
32 magnetic separation pipe
40 silo
50 calcining apparatus
61 mixer
62-65 crystallization tank
70 gypsum slurry
71 slurry supply pipe
72, 74 circulation pipe
75 motor
76 vane
78 foam
80 ventilation hole
82 steam generator
84, 86 steam introduction pipe
88 temperature sensor

The invention claimed is:

1. A method of reclaiming gypsum particles from wasted gypsum boards, the method comprising:
    crushing and calcining wasted gypsum boards to gypsum granular solid,
    mixing the gypsum granular solid with water to form gypsum slurry in a mixing tank,
    generating gypsum particles in the gypsum slurry in at least a crystallization tank wherein surfactants from the wasted gypsum boards cause foam on the gypsum slurry, and
    blowing heated steam into the gypsum slurry in the crystallization tank at a height between a top surface of the gypsum slurry and ⅓ below the top surface of the gypsum slurry so that the gypsum slurry is heated only by the heated steam, and the foam on the gypsum slurry is eliminated by the heated steam.

2. The method of reclaiming gypsum particles according to claim 1, wherein the gypsum slurry is maintained at a predetermined temperature without a thermal source, other than the heated steam, provided in said at least a crystallization tank.

3. The method of reclaiming gypsum particles according to claim 1, wherein said at least a crystallization tank comprises plural crystallization tanks in series, the gypsum slurry which is resultant by mixing the gypsum granular solid with water is supplied into a most upstream crystallization tank, the gypsum slurry is moved from an upstream tank to a downstream tank, and the heated steam is only blown into the most upstream crystallization tank.

4. The method of reclaiming gypsum particles according to claim 1, wherein said heated steam at a point where the heated steam is blown into the gypsum slurry is at 100 to 150 degree Celsius and has 1.2 to 3 atmospheric pressure in absolute pressure.

5. The method of reclaiming gypsum particles according to claim 4, wherein said heated steam heats the gypsum slurry to a temperature from above room temperature to not higher than 90 degree Celsius.

\* \* \* \* \*